United States Patent
Pal et al.

(10) Patent No.: US 11,256,239 B2
(45) Date of Patent: Feb. 22, 2022

(54) METHODS AND SYSTEMS FOR NUMERICAL PREDICTION AND CORRECTION OF PROCESSES USING SENSOR DATA

(71) Applicant: ANSYS, INC., Canonsburg, PA (US)

(72) Inventors: Deepankar Pal, Holladay, UT (US); Madhu Keshavamurthy, Austin, TX (US)

(73) Assignee: ANSYS, INC., Canonsburg, PA (US)

( * ) Notice: Subject to any disclaimer, the term of this patent is extended or adjusted under 35 U.S.C. 154(b) by 153 days.

(21) Appl. No.: 16/674,809

(22) Filed: Nov. 5, 2019

(65) Prior Publication Data

US 2021/0048802 A1 Feb. 18, 2021

Related U.S. Application Data

(60) Provisional application No. 62/886,257, filed on Aug. 13, 2019.

(51) Int. Cl.
| | | |
|---|---|---|
| G05B 99/00 | (2006.01) | |
| G05B 19/418 | (2006.01) | |
| G05B 19/4097 | (2006.01) | |
| G06F 3/14 | (2006.01) | |

(52) U.S. Cl.
CPC ... G05B 19/41865 (2013.01); G05B 19/4097 (2013.01); *G05B 2219/32019* (2013.01); *G05B 2219/32341* (2013.01); *G05B 2219/35012* (2013.01); *G06F 3/14* (2013.01)

(58) Field of Classification Search
CPC .......................................... G05B 2219/32019
USPC ......................................................... 700/105
See application file for complete search history.

(56) References Cited

U.S. PATENT DOCUMENTS

| | | | | |
|---|---|---|---|---|
| 10,363,705 | B1* | 7/2019 | Marsch ................. | B33Y 50/00 |
| 10,884,396 | B2* | 1/2021 | Roychowdhury . | G05B 19/4099 |
| 2015/0328839 | A1* | 11/2015 | Willis ................ | G05B 19/4099 |
| | | | | 700/98 |
| 2016/0136896 | A1* | 5/2016 | Wighton ................ | B33Y 50/00 |
| | | | | 700/120 |
| 2016/0236414 | A1* | 8/2016 | Reese .................... | B33Y 50/02 |
| 2017/0192414 | A1* | 7/2017 | Mukkamala ........ | H04L 63/0823 |

(Continued)

*Primary Examiner* — Suresh Suryawanshi
(74) *Attorney, Agent, or Firm* — Womble Bond Dickinson (US) LLP

(57) ABSTRACT

Methods and systems are disclosed for simulating a fabrication process based on real time sensor measurements obtained during the process. In one embodiment, a first simulation of the process computes a set of predicted physical responses based on a first set of assumed boundary conditions, and then, during the fabrication process sensor measurements are obtained and used to compute a second set of boundary conditions. A second simulation, based on the second set of boundary conditions, can then be performed to compute an updated set of predicted physical responses that can be compared to the previously computed set of physical responses. The difference(s) can be used to determine line, surface or volumetric response distribution from point, line or surface boundary conditions respectively, whether and how to modify the fabrication process (or other processes) and how to take additive and other manufacturing process decisions real-time using simulation. Other examples are also described.

32 Claims, 15 Drawing Sheets

(56) References Cited

U.S. PATENT DOCUMENTS

2018/0071868 A1\* 3/2018 Goehler ................ B33Y 30/00
2018/0314235 A1\* 11/2018 Mirabella ............... G06F 30/23
2021/0046710 A1\* 2/2021 Koopmans ............. G06F 30/23

\* cited by examiner

METHODS AND SYSTEMS FOR NUMERICAL PREDICTION AND CORRECTION OF PROCESSES USING SENSOR DATA

This application claims the benefit and filing date of U.S. Provisional Patent Application No. 62/886,257, filed Aug. 13, 2019, and this provisional patent application is hereby incorporated herein by reference.

BACKGROUND

Existing simulation methods have been used to simulate fabrication processes. For example, simulation software from ANSYS, Inc. has been used to simulate additive manufacturing (AM) processes. AM processes can be performed by a 3D printer, and a 3D printer can fabricate an object in a layer by layer process. In this process a layer of powder, such as a metallic powder, is applied through a nozzle to an object being fabricated, and then the powder is selectively melted by the 3D printer's laser (or other energy source) and then the melted material cools and solidifies into a shaped layer on the object that is being fabricated. The speed of the powder extruded through the nozzle can be controlled during the AM process. Then another layer of powder can be applied and the process can be repeated (for example, selective melting followed by cooling, etc.). Existing simulation methods and models allow an additive manufacturing process to be simulated from start to finish to reveal, based on the assumptions and inputs provided to the simulation models, the predicted properties of the finished object, such as shape, size of portions of the object, etc. If the predicted responses do not match a desired set of thermomechanical responses, the simulation can be repeated with different assumptions and inputs to produce another set of predicted properties, and this can be repeated until the predicted responses converge to an adequate match of the desired set of responses. The outputs from a simulation that produces an adequate match can be used to provide control parameters to a 3D printer. If the set of assumptions and inputs do not accurately reflect actual physical systems, many iterations of the simulation may be required.

SUMMARY OF THE DESCRIPTION

According to one aspect described herein, a simulation of a process can use real-time sensor measurements to provide boundary conditions and create a simulation that predicts results of the process based on the real-time sensor measurements so that the results are based on actual physical properties using, for example, a CALPHAD approach that uses the sensor measurements. The sensor measurements can be captured by sensors in real time during the process, such as in the middle of the process before the process is completed, and the sensor measurements can be used to create updated inputs or assumptions that are based on the sensor measurements and are different than the initial inputs or assumptions which were used in an initial simulation of the process. The updated inputs or assumptions, such as boundary conditions, can then be used in a subsequent simulation to predict results, such as evolving temperatures and deformations of the process. These predicted results can be compared to desired results and the comparison can inform how to modify the process either as the process continues or in a new process that is started with modified control parameters that are based on the subsequent simulation. The process can be used, for example, to fabricate an object or part using an AM process. For example, the control parameters of an additive manufacturing process can be corrected or modified for the current and future additive manufacturing layers on the fly using the error between the expected and real time volumetric data provided by the initial simulation and the subsequent simulation. The initial simulation and the subsequent simulation can use, in one embodiment, a finite element solver that uses voxels to mesh the part in an STL file, and the top surface configuration of the voxels can be matched to the positions of sensor measurements that are collected across the surface, for example by an FLIR sensor, so that each of the top surface voxels of the part has a sensor measurement associated with it; for example, one embodiment can match an exposed surface, line or point of one or more sensor measurements such as temperature or displacement (e. g., movement), either a one-time measurement or a time series set of measurements, with a sliced CAD surface such as a sliced STL surface. According to another aspect, an embodiment can project results from the subsequent simulation, such as results from the voxels on a mesh grid, to be mapped to an augmented reality display device. The augmented reality display in one embodiment can display information showing how the design has changed as a result of modifications of the process.

In one embodiment, a method for improving a fabrication process can include the following operations: performing a first simulation of a fabrication process using available process simulation methods and assumed boundary conditions, where the first simulation computes a first set of results to define predicted physical volumetric responses such as temperatures and deformations for a first object to be created in the fabrication process and wherein the first set of results are based on a first set of one or more boundary conditions; receiving, from one or more sensors, sensor measurements of one or more parameters that are sensed by the one or more sensors during the fabrication process after the fabrication process has been initiated; performing a second simulation based on the sensor measurements, the second simulation computing a set of results based on the sensor measurements and based on a set of boundary conditions that are based on the sensor measurements; and storing the set of second results for use in performing a modified fabrication process. In one embodiment, the modified fabrication process can be a continuation of the fabrication of the first object after receiving the sensor measurements. In one embodiment, the method can further include outputting the second set of results to drive the modified fabrication process for the continued fabrication of the first object. In one embodiment, the modified fabrication process can be used to fabricate a second object after the first object was fabricated or after its fabrication was aborted. In one embodiment, the method can further include the operation of: comparing the first set of results to the second set of results to determine a degree of discrepancy of at least one of temperature or displacement of one or more simulated nodes on a mesh in a finite element analysis or computational fluid dynamics simulation of the first object.

In one embodiment, the method can further include the operation of: dynamically updating the fabrication process as it occurs without stopping it to create the modified fabrication process based on the degree of discrepancy. In one embodiment, the fabrication process can include an additive manufacturing process, and wherein information about the first object is stored in a computer automated design file having an STL file format. In one embodiment, the method can further include the operation of: matching a sensed position on the first object during the fabrication process with a location, such as a voxel or node, in the computer automated design file.

In one embodiment, the first set of boundary conditions (assumed) and the second set of boundary conditions (based on real-time capture of stimuli such as temperature or displacements on the exposed surfaces) are constraints used for the solution of one or more differential equations which are solved in the first simulation and the second simulation respectively.

In one embodiment, the sensor measurements can comprise image data of the first object, and the image data is used to derive displacement data for nodes on the top surface of the object or other surfaces based on their exposure availability.

In one embodiment, the sensor measurements can include temperature data for locations on the first object during the fabrication process, and these locations are matched to the position of each node or voxel in a set of nodes or voxels in at least the second simulation. The sensor measurements can also include position data for a set of nodes or voxels, wherein this position data can show displacements or movements of voxels as a result of the fabrication process.

In one embodiment, the method can further include the operation of outputting display data to an augmented reality display, where the display data is based on the second set of results. This display data can be displayed on a head mounted display (or other display device).

The aspects and embodiments described herein can include non-transitory machine readable media that store executable computer program instructions that when executed can cause one or more data processing systems to perform the methods described herein when the computer program instructions are executed by the one or more data processing systems. The instructions can be stored in non-volatile memory such as flash memory or dynamic random access memory which is volatile or other forms of memory.

The methods, systems, and non-transitory machine readable storage media described herein can also be extended beyond fabrication processes so that the one or more embodiments described herein can be used in other contexts in which computer modeling can be used to simulate or represent physical systems or physical processes. For example, these other contexts can include: (a) real-time volcanic finite element analysis that can model and predict mechanical responses from volcanic systems based on sensor measurements that can be used to compare to a prior simulation or model of the volcanic system; (b) mechanical systems having contact interfaces between components that can produce both thermal and mechanical responses over time based on simulated inputs; and (c) optical responses from optical sensors used in, for example, driving or assisted driving.

These other contexts can also include the use of embodiments to detect and potentially mitigate defects in, for example, an object being created during a fabrication process, such as an additive manufacturing process. These other contexts can also include embodiments in which volumetric temperatures from, for example, a simulation can be used to predict thermal strain which can be used to compute residual stresses and displacements. Another context can include embodiments that use acoustic boundary conditions that are solved for (e.g. in a second simulation). Another context can involve embodiments in which the simulations involve car crashes and the sensor(s) measure thermal and displacement values during a car crash on a real physical car and then these sensor(s) measurements can be used to continue the simulation of the crash or to predict strain on the car, etc. or to predict how the design of the car can be improved to reduce negative effects on the car from the crash.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1:
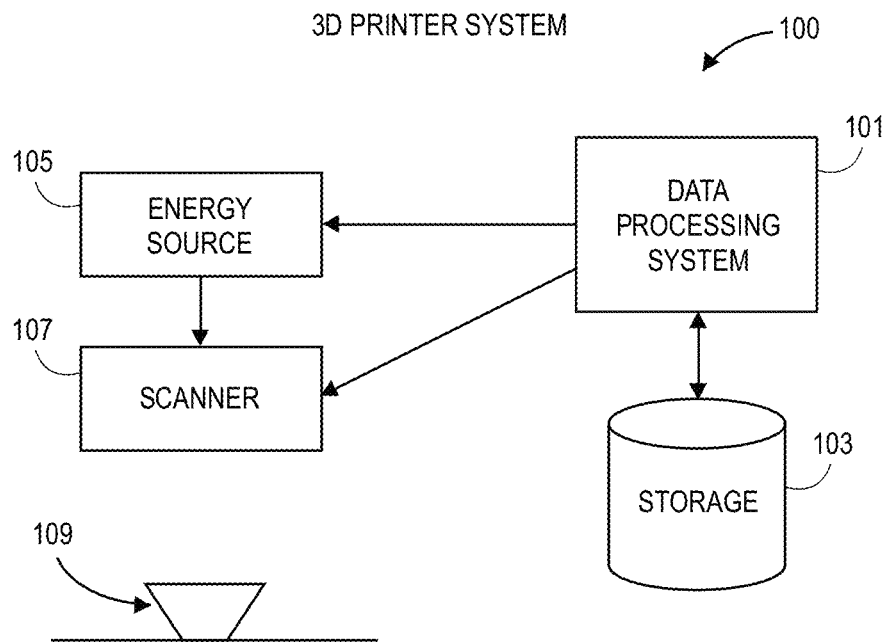
FIG. 1 shows, in block diagram form, an example of a 3D printer system which can be used with one or more embodiments described herein.

The methods and systems described herein can use simulations and measurements that can be used to improve a process for fabricating an object, such as an additive manufacturing process. The simulations and measurements can be performed during the process to determine the volumetric response distributions and whether to modify the process (on the fly) while the process continues to finish fabrication of the object under consideration or to create modified control parameters for a future process that fabricates a second object. In one embodiment, a 3D printer can be used in the process to fabricate an object using, for example, an additive manufacturing (AM) process. FIG. 1 shows an example of a 3D printer.

Referring now to FIG. 1, a 3D printer system 100 can include a data processing system 101 that retrieves, from storage 103, the CAD (computer automated design) file that specifies data that is used by the 3D printer to control the energy source 105 and the scanner 107 to create the object 109. The CAD file may specify data used to create the object 109 using an AM process, and the data processing system 101 interprets the file so as to make decisions about how to run and control the energy source 105 and the scanner 107. In one embodiment, the CAD file can be converted to an STL file format which is a known file format for use in computer aided manufacturing and in 3D printing. The energy source 105 provides, in one embodiment, heat that is directed towards the object 109 through the scanner 107. In one embodiment, the energy source 105 can be a laser which generates a beam of energy that can be directed to a point or spot on the object based upon how the scanner 107 controls the positioning of the laser beam. The laser beam can be scanned in a pattern across the object 109 to selectively melt portions of the powder to create a new layer on top of the object 109. In another embodiment, the energy source may be an electron beam which is also controlled by a scanner to direct the electrons towards the object, such as object 109, which is being manufactured. In some embodiments, the energy source 105 may be one or more energy sources that may generate one or more types of energy that can be directed towards an object being fabricated. The 3D printer system 100 shown in FIG. 1 can be used in the one or more embodiments described herein which use one or more sensors during the fabrication process to provide sensor measurements to a simulation tool which can then use those sensor measurements to perform an updated simulation as described herein.

Figure 2:
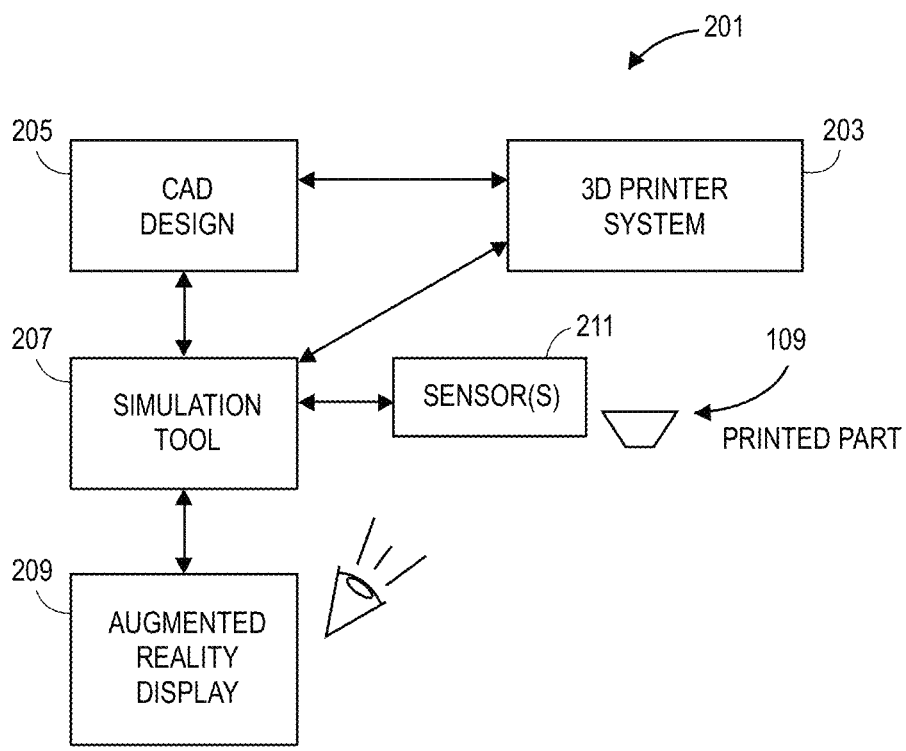
FIG. 2 shows an example of a simulation system according to one or more embodiments described herein which can include a 3D printer system as well as a simulation tool.

FIG. 2 shows an example of a system 201 which can include a 3D printer system 203 and one or more sensors 211 as part of the system 201 that can use sensor measurements obtained during the fabrication process. The 3D printer system 203 shown in FIG. 2 can be, in one embodiment, the same as the 3D printer system 100 shown in FIG. 1. The 3D printer system 203 can be coupled to storage, such as a hard drive or flash memory which contains the CAD design 205. The CAD design 205 can in one embodiment be an STL file that specifies geometry data and other information about the object to be fabricated. The simulation tool 207 can be a system, such as a data processing system configured with simulation software that can perform one or more of the methods described herein such as the use of sensor measurements in order to perform an updated simulation based upon sensor measurements obtained from one or more sensors, such as one or more sensors 211 which are coupled to the simulation tool 207 and these sensor measurements can be converted to appropriate boundary conditions. The simulation tool 207 can be coupled to receive the CAD design 205 in order to perform at least some of the methods described herein, such as the method shown in FIG. 4 which is further described below. The 3D printer system 203 can be controlled based upon the CAD design 205 and control parameters from the simulation tool 207 to create the object 209. The fabrication process can begin in one embodiment with an initial set of inputs and assumptions based upon an initial simulation by the simulation tool 207, and then the fabrication process can be altered on the fly during the process before the process has been completed based upon one or more sensor measurements from the one or more sensors 211 which provide data to the simulation tool 207 during the simulation process. In one embodiment, the simulation tool 207 can provide display data or information to an augmented reality display device 209. In one embodiment, the augmented reality display device 209 can be a headmounted display or glasses that allow the user to wear the display. The display device 209 can in one embodiment allow the user to see the object 109 and also display data about the object including data about modifications to the object that have been made after the simulation tool 207 adjusts the fabrication process on the fly while the fabrication process is ongoing to create the object 109. For example the speed of the material extruded through a nozzle or the temperature of nozzle can be adjusted in the middle of the fabrication process based upon the adjustments made by the simulation tool 207. The system 201 can be used to perform the methods shown in FIGS. 3, 4, 5, 6A, and 6B in one embodiment. In one embodiment, the data processing system which controls the 3D printer system 203 can include the simulation tool 207 such that the simulation tool 207 executes on the data processing system which controls the 3D printer system, such as the data processing system 101. In another embodiment, the simulation tool 207 can execute on a separate data processing system which is separate from the data processing system that controls the 3D printer system 203.

A method according to one embodiment will now be described while referring to FIG. 3. In operation 301 in FIG. 3, a data processing system can execute a simulation model that has been configured with default assumptions, such as default boundary conditions, to obtain an initial set of predicted physical properties for a first object to be fabricated. In one embodiment, this data processing system can include the simulation tool 207 or be the simulation tool 207 shown in FIG. 2. The simulation model can be implemented in modeling software that uses finite element analysis methods along with computational fluid dynamics methods to generate the predicted volumetric physical responses such as temperature and/or displacements based on accurate properties predicted using CALPHAD approaches for the first object to be fabricated. Examples of such modeling software include the ANSYS Additive Suite from ANSYS Inc. of Canonsburg, Pa. and 3DSIM. In operation 303, the fabrication process can be activated according to the results from the initial simulation which was performed in operation 301. The results from the initial simulation can include data that is used to control the 3D printing system such as the scan speed of the laser, the power of the laser, the patterns of the scan for the laser, and the chemical compositions of the metallic powders which are available for the 3D printing process. In one embodiment, this data can be used to control the fabrication process after the fabrication process has been activated in operation 303. While the fabrication process is being performed after the activation in operation 303, one or more sensors, such as one or more sensors 211 (shown in FIG. 2) can provide sensor measurements to a simulation tool, such as simulation tool 207. This is shown as operation 305 in FIG. 3. These sensor measurements can be real time sensor measurements that can include measurements of temperature and also include image data such as an infrared image of the object being fabricated during the fabrication process. In one embodiment, the sensor can be an FLIR sensor. The temperature data in one embodiment can be a set of temperatures at different points on the surface of the object being fabricated and these points (with corresponding temperature values) can be matched to corresponding positions, such as surface nodes or voxels, in a mesh grid in the simulation model, such as the simulation model which was executed in operation 301. The simulation tool can then, in operation 307, use the sensor measurement data received from operation 305 to compute current boundary conditions of the first object based on the real time sensor measurement data and material properties of the object getting printed, for example, thermal conductivity based on the printed material chemical composition. Then in operation 309, the simulation tool (such as simulation tool 207 shown in FIG. 2), can execute a simulation model again with the simulation model configured with the current boundary conditions computed in operation 307 (instead of the default boundary conditions) to obtain a current set of physical responses, such as volumetric nodal degrees of freedom for the first object. In operation 311, the simulation tool can then determine a degree of discrepancy in temperature and/or displacement based on a comparison between the initial and the current set of surface displacement/temperature conditions. Based on this discrepancy, the simulation tool in operation 313 can dynamically update the fabrication process according to the degree of discrepancy. The method can continue in operation 315 by determining whether or not the fabrication process has been completed. If it has been completed, then the method is done as shown in operation 317. On the other hand, if the fabrication process has not been completed then processing can revert back to operation 305 to continue monitoring the fabrication process by collecting sensor measurement data during the fabrication process.

Figure 3:
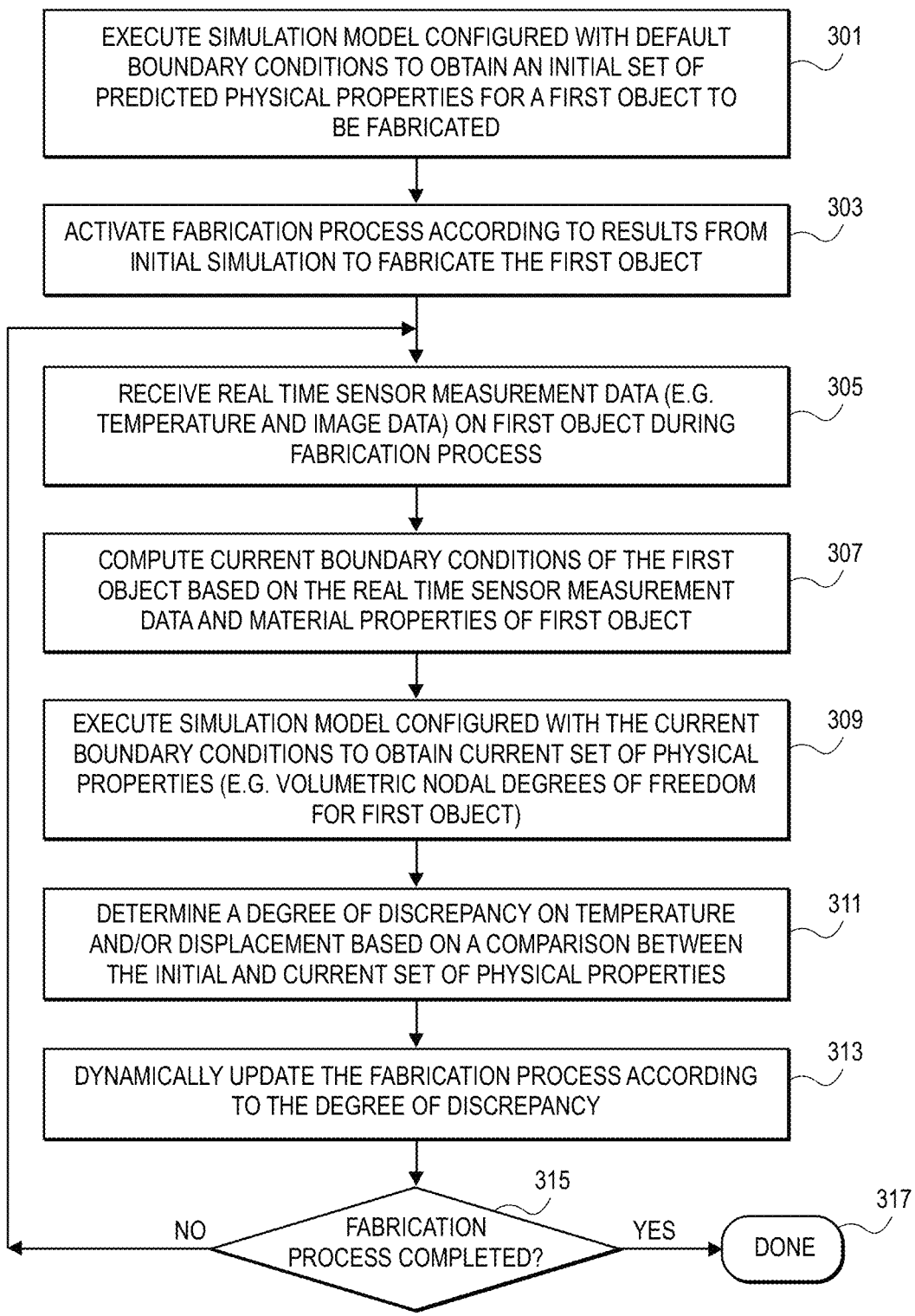
FIG. 3 is a flowchart which illustrates a method according to one embodiment described herein.
Figure 4:
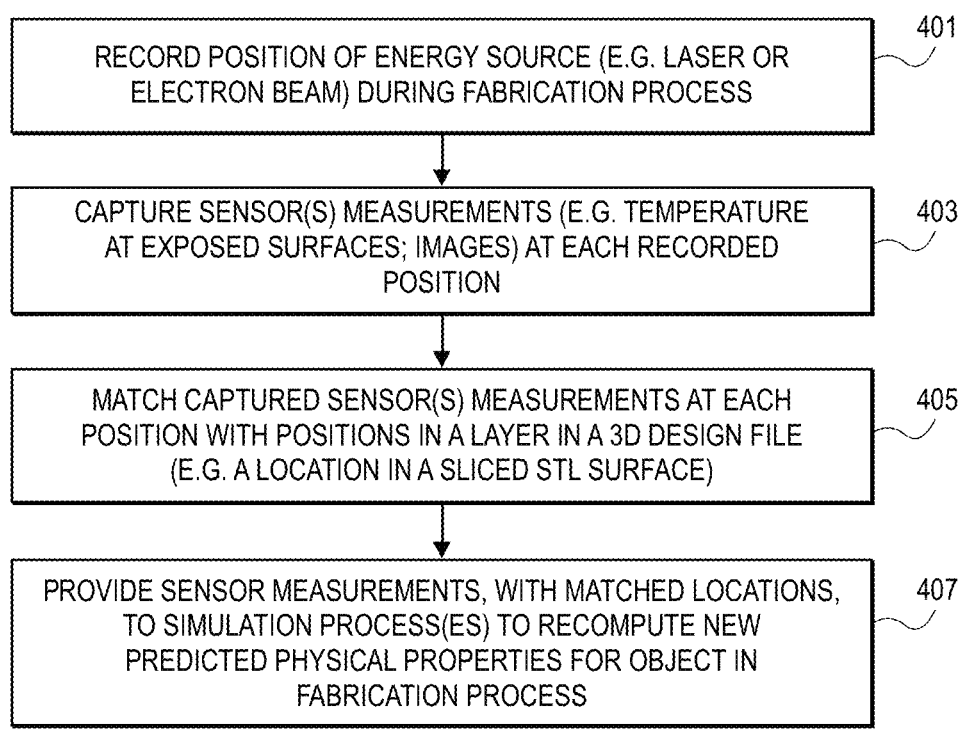
FIG. 4 is a flowchart which illustrates a method according to one embodiment described herein.

The method shown in FIG. 3 can use the method shown in FIG. 4 in order to match the sensor measurements captured at different positions on the object to positions within the CAD file that describes the object being fabricated. In operation 401, the system can record the position of the energy source during the fabrication process. In one embodiment, these positions may be known from time data and the data file that describes the data used to control the energy source and the scanner, such as the scanner 107 shown in FIG. 1. In operation 403, sensor measurements are captured at each recorded position. Then in operation 405, a simulation tool can match the captured sensor measurements at each position on the surface or line or point with positions in a layer in a 3D design file, such as the positions of nodes or voxels in a sliced surface in an STL file. By matching the sensor measurements which were captured to the positions in a layer in the CAD file, the simulation can use actual real time sensor measurements at positions that correspond to the nodes or voxels in the mesh grid used in the simulation to provide an updated simulation that reflects the current physical properties of the object being fabricated. This is shown as operation 407. In operation 407, these sensor measurements that have been matched or associated with locations in the mesh grid are used in updated simulation processes to recompute predicted physical properties for the object in the fabrication process.

Figure 5:
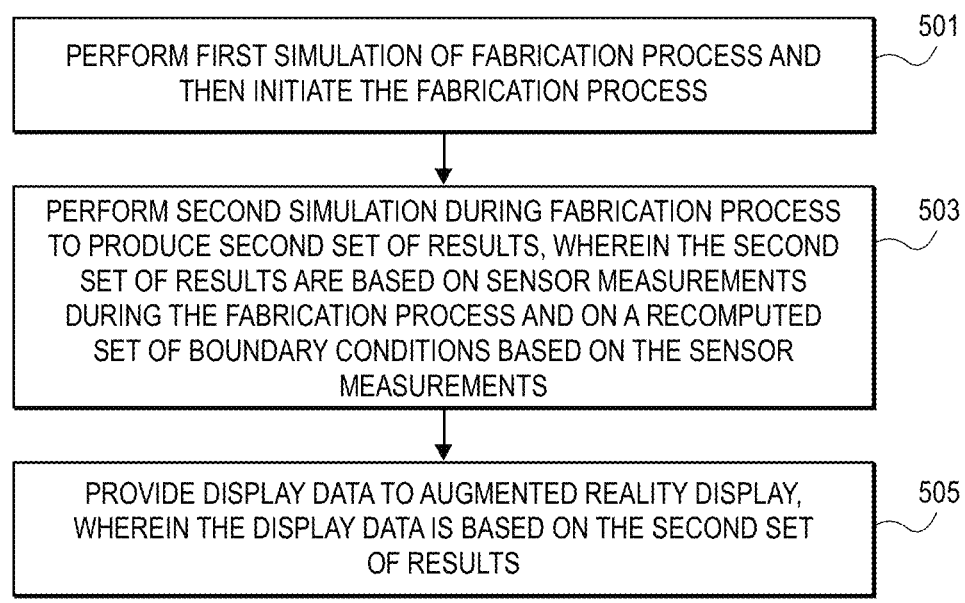
FIG. 5 is a flowchart which illustrates a method according to one embodiment described herein.
Figure 8:
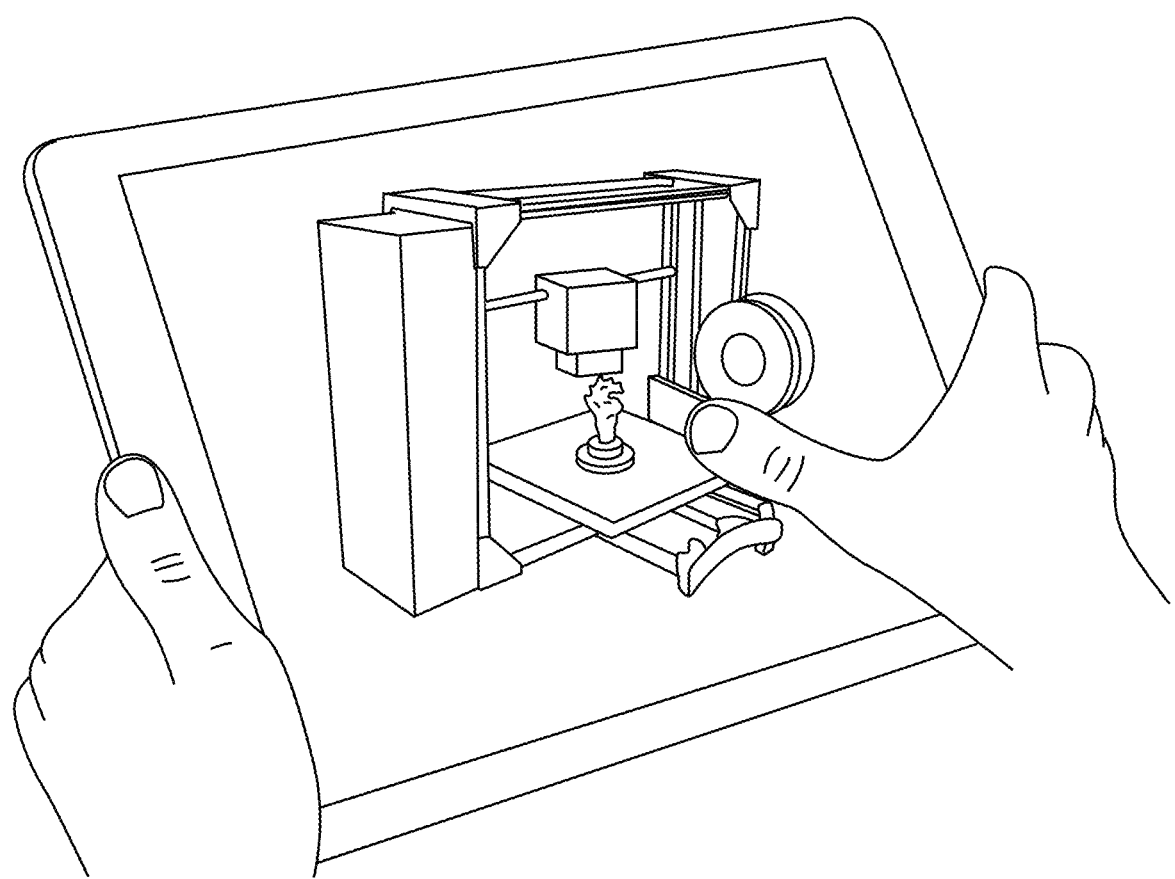
FIG. 8 shows an example of a graphical user interface that shows an augmented reality display of an object after a second simulation, using real time sensor measurements from the object, provides updated volumetric temperature distribution data based on those real time sensor measurements.

In one embodiment, outputs from the simulation process can be provided to an augmented reality display device in order to display data about the object being fabricated during the fabrication process. FIG. 5 shows an example of a method which provides such data to an augmented reality display device. In operation 501, a first simulation of the fabrication process can be performed using default or initial assumptions, such as default boundary conditions and then the fabrication process can be initiated. In operation 503, a second simulation can be performed during the fabrication process to produce a second set of results, wherein the second set of results are based on sensor measurements during the fabrication process and are based on a recomputed set of boundary conditions that are based on the sensor measurements. Then in operation 505, the system can provide display data to an augmented reality (AR) display device, where the display data is based upon the second set of results that show how the object will deviate from the initial design based upon the sensor measurements and based upon adjustments to the fabrication process that were made in response to outputs from the updated simulation. FIG. 8 shows an example of an AR display device that displays a part or object being fabricated and also displays data about the part or object from the second simulation that uses sensor data obtained from sensors that monitor the fabrication process. In FIG. 8, an AR display device shows a volumetric temperature distribution that was solved using a real-time capture of boundary conditions.

Figure 6A:
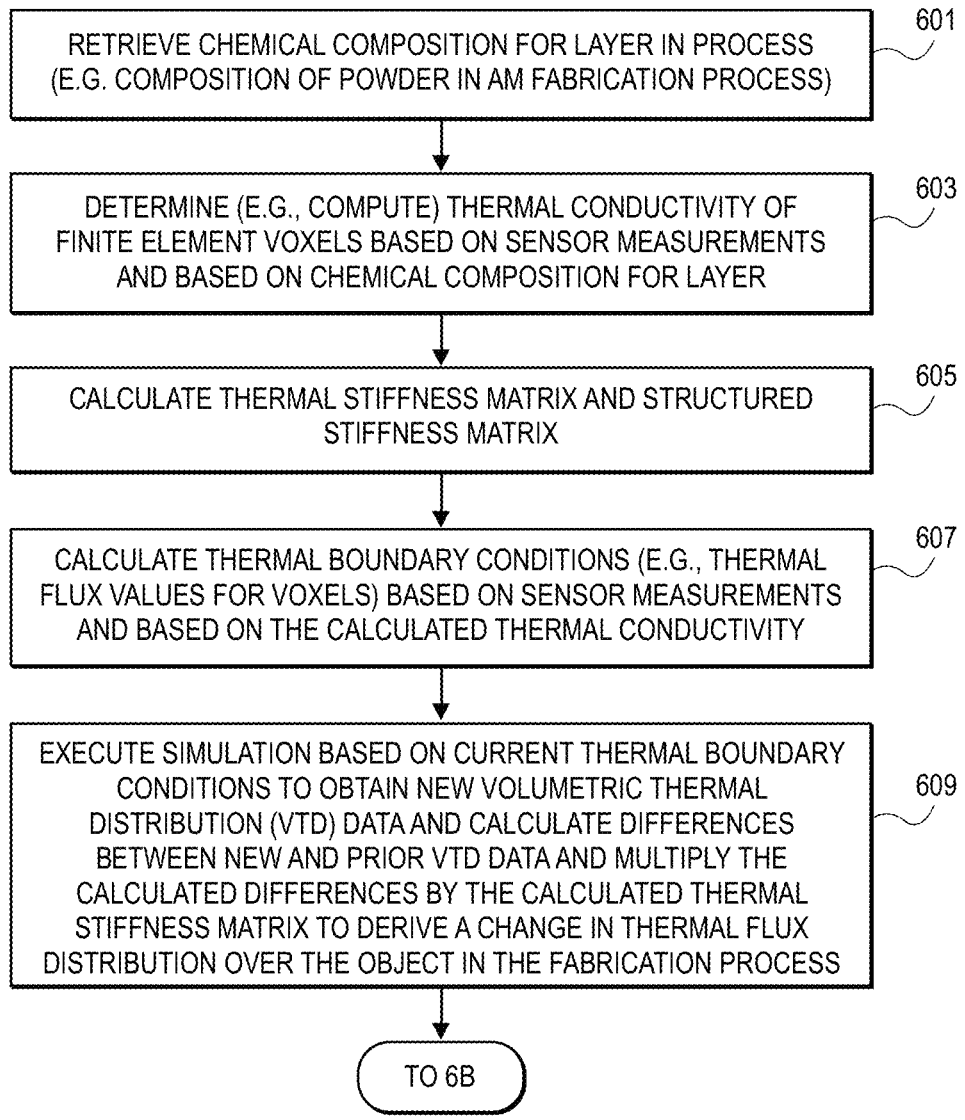
FIG. 6A is a flowchart which illustrates a method according to one embodiment which can be used in conjunction with the method shown in FIG. 6B.
Figure 6B:
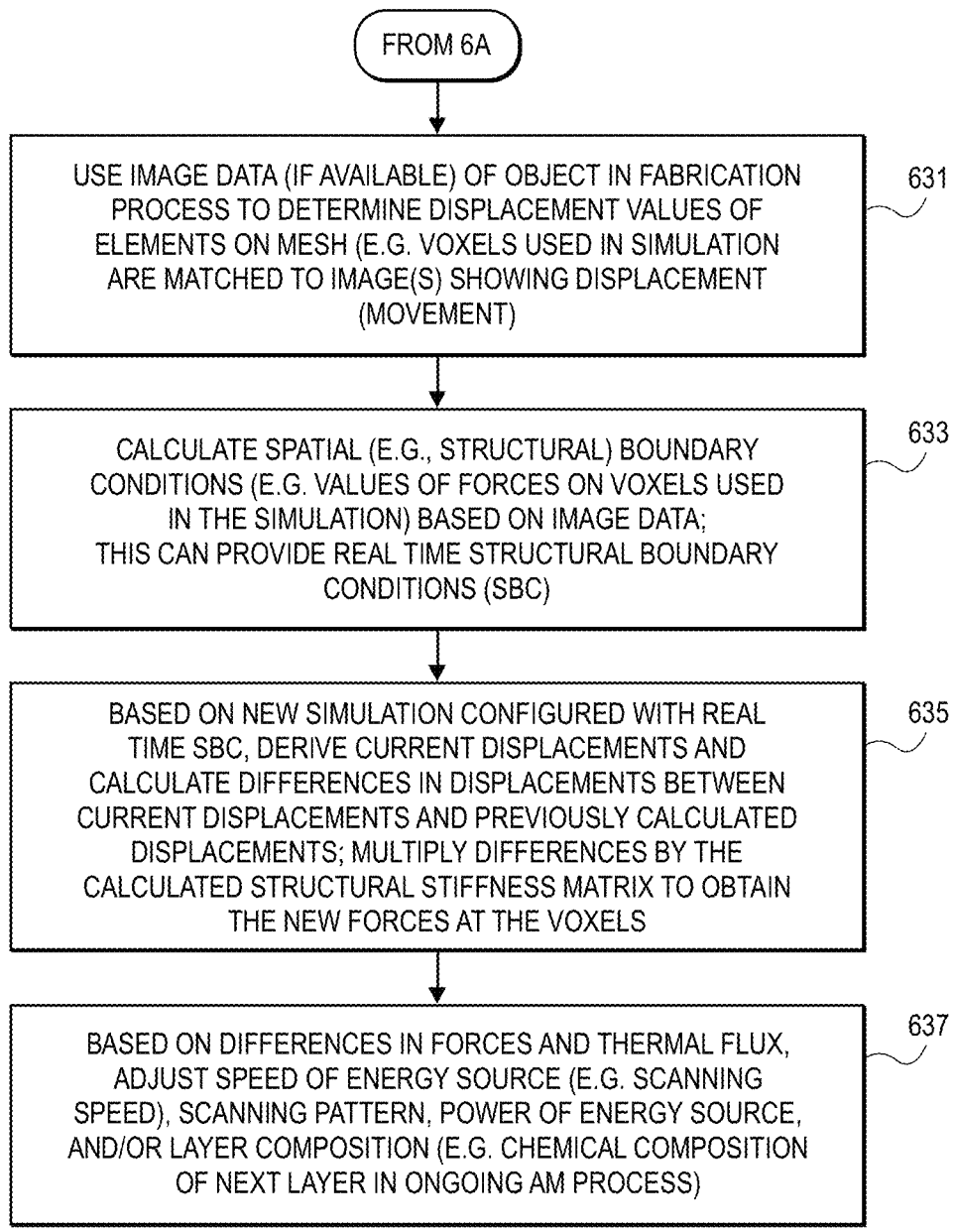
FIG. 6B is a flowchart which illustrates a method according to one embodiment which can be used in conjunction with the method shown in FIG. 6A.

The following description will provide a more specific example of one embodiment while referring to FIGS. 6A and 6B. The method shown in FIG. 6A begins after an initial simulation has been performed using assumed boundary conditions. In operation 601 of FIG. 6A, a simulation tool can retrieve the chemical composition for a current layer in the process; for example, data about the chemical composition of a metallic powder used in an additive manufacturing fabrication process can be obtained for the current layer that is being used in an ongoing fabrication process. In operation 603, the simulation tool can use a non-equilibrium CALPHAD approach to compute thermophysical properties such as thermal conductivity, density and specific heat of finite element voxels based on centroid temperature and material state and obtained during the ongoing fabrication process and based on the chemical composition for the layer. Examples of non-equilibrium CALPHAD approaches are described in U.S. patent application Ser. No. 16/457,902 which was filed on Jun. 28, 2019 by Deepankar Pal and Abdul Khader Khan, and this patent application is incorporated herein by reference. In operation 605, this simulation tool can calculate a thermal stiffness matrix and can also calculate a structural stiffness matrix. Then in operation 607, the simulation tool can calculate updated thermal boundary conditions, such as thermal flux values for the voxels in the mesh grid of the simulation model of the object being fabricated, based on sensor measurements and based on the calculated thermal conductivity which was computed in operation 603. Then in operation 609, the simulation tool can execute a new simulation based on the current thermal boundary conditions to obtain new volumetric thermal distribution (VTD) data. This new VTD data can be used to calculate the differences between the new VTD data and prior VTD data using assumed boundary conditions, and these differences can be multiplied by the calculated thermal stiffness matrix to derive a change in thermal flux distribution over the object in the fabrication process. This change in the thermal flux distribution can be used to compute adjustments in process parameters during the fabrication process in order to attempt to match a desired set of results for the object being fabricated, and this is described in conjunction with operation 637 described further below.

Referring now to FIG. 6B, in operation 631, image data, if available, for the object in the fabrication process can be used to determine displacement values for elements on the mesh, such as voxels used in the simulation. In one embodiment, the voxels used in the simulation can be matched to locations in the image data showing displacement, such as movement of a node or other feature on the object which occurred during the fabrication process. This movement or displacement can indicate a deviation from desired results, and the method can modify the fabrication process based on this deviation to attempt to return the fabrication process along the path that produces desired results for the object being fabricated. In operation 633, the simulation tool can calculate spatial boundary conditions such as values of forces on nodes or voxels or voxels used in the simulation based on the image data. In one embodiment, this can provide real-time and/or post-fabrication structural boundary conditions. The simulation tool can then use the real-time and/or structural boundary conditions to perform a new simulation configured with these real-time structural boundary conditions. Based on this new simulation, the simulation tool in operation 635 can calculate differences in displacements between the currently calculated displacements and the previously calculated displacements. These differences can be multiplied by the calculated structural stiffness matrix (calculated in operation 605) to obtain the new forces at each of the nodes or voxels or voxels. Then in operation 637, the simulation tool can adjust control parameters during the fabrication process based on the differences in forces and thermal flux that were calculated in the method shown in FIGS. 6A and 6B. For example, in one embodiment, the simulation tool can provide updated data that adjust the speed of the scanning of the energy source, the scanning pattering of the energy source, the power of the energy source and/or the layer composition, such as selecting a different metallic powder for use for a particular layer during the ongoing fabrication process. The equations and operations for thermal and structural boundary conditions remains the same, except for a structural part that has 3 degrees of freedom per node making the K matrix (instead of thermal conductivity matrix-we call it structural stiffness matrix) of size 3 times bigger both in row and column directions. In addition, the 'transient' solution need not be computed as for this case the physics constraints will only allow 'quasi-static' condition to be incorporated so there will not be any structural analogs of 'specific heat' matrix for this solution.

The following equations can be used for carrying out the operations mentioned herein for at least some embodiments:
Thermal Approach (Equations and Operations)
Real-Time Boundary Capture Finite Element Method The thermal conduction problems can be solved using a Finite Element methodology using equations (1-4) as follows:

$$[C]\{\dot{T}\}+[K_C]\{T\}=\{f\} \quad (1)$$

where $[C]$ denotes the specific heat matrix and $[K_C]$ denotes the thermal conductivity matrix, $\{T\}$ denotes the temperature which we are solving for and $\{f\}$ denotes the flux vector.

If there is a Dirichlet Boundary condition such as temperatures prescribed at certain M point, line or surface nodes (it should be noted that there is only 1 degree of freedom per node in thermal FEA problems due to the scalar nature of the thermal field), the temperatures in a discretized domain are stored in the vector $\{T\}_{bc}$ with non-zero values and other zero values of the size NÃ−1. A flux $\{f\}_{tot,bc}$ is computed using the following equation. It should be noted that in one embodiment we know the temperatures at the bottom of the base plate and top surface of the part getting fabricated.

$$\{f\}_{tot,bc}=[K_C]\{T\}_{bc} \quad (2)$$

The system of equations in (1) is then reduced to N-M with reaction flux computed at the N-M nodes at their respective coordinates using the following equation.

$$\{f\}_{shortened,bc}=-\{f\}_{tot,bc}|_{N-M} \quad (3)$$

The Neumann boundary condition flux $\{f\}_{Neumann,bc}|_{N-M}$ is then added to $\{f\}_{shortened,bc}$ in the mapped N-M system as follows $$\{f\}|_{N-M}=\{f\}_{shortened,bc}+\{f\}_{Neumann,bc}|_{N-M} \quad (4)$$

For an assumed boundary condition case, the Neumann Boundary case on the top surface of the part is assumed and the bottom surface temperature is known. The difference between the Neumann (assumed on top surface) and Dirichlet boundary condition (top surface infrared information) is measured and then the Temperatures are computed using equations 5-15) in one embodiment.

The $\{f\}|_{N-M}$ from the mapped N-M system is supplied to (1), leading to the thermal solution (for steady state-the $[C]\{\dot{T}\}$ portion of the equation (1) is not required unless 'transient solution' is mentioned-which is generally the case in metal and polymer additive manufacturing—although both of the 'steady state' and 'transient' solver capabilities are present with a current solver in one embodiment) in the mapped N-M system. Once this solution is computed, the thermal solution along with Dirichlet condition is back propagated using the inverse N-M to N map.

Conversion of Infrared Signal to Exposed Point, Line or Surface Temperatures

The following equations can be used to first convert the infrared signal from the thermal sensor device—(e.g., a FLIR ONE PRO) to point, line or surface temperatures.

First, atmospheric transmission constants are defined which are used throughout the calculation namely $A_T\alpha_1$, $A_T\alpha_2$, $A_T\beta_1$, $A_T\beta_2$ and $A_TX$. For the FLIR ONE PRO camera, these constants can be:

$A_T\alpha_1 = 0.006569$ $A_T\alpha_2 = 0.01262$ $A_T\beta_1 = -0.002276$ $A_T\beta_2 = -0.00667$ $$A_TX = 1.9 \tag{5}$$

Second, the transmission through the IR window is computed from IR signal strength directly in terms of emissivity $\varepsilon_{wind}$ and reflectivity $\rho_{wind}$. These parameters are provided as follows:

$\varepsilon_{wind} = 1 - IR_{strength}$ $$\rho_{wind} = 0 \tag{6}$$

Third, the transmission through the air is computed in terms of atmospheric transmission constants, relative humidity and FLIR ONE PRO image metadata.

$$H_2O_{measure} = \left(\frac{RH}{100}\right) e^{\left(1.5587 + 0.06939 ATemp - 0.00027816 ATemp^2 + \text{Å} 0.00000068455 ATemp^3\right)} \tag{7}$$

$$\tau = A_T X e^{-\sqrt{OD/2}} \left(A_T\alpha_1 + A_T\beta_1 \sqrt{H_2O_{measure}}\right) + \\ (1 - A_T X) e^{-\sqrt{OD/2}} \left(A_T\alpha_2 + A_T\beta_2 \sqrt{H_2O_{measure}}\right) \tag{8}$$

Fourth, the raw object was modified based on radiative attenuation from the environment (atmospheric, window and reflective) depending on above-mentioned parameters.

$$\rho_{raw1} = \frac{PR1}{PR2\left(e^{\left(\frac{PB}{RTemp+273.15}\right)} - PF\right)} - PO \tag{9}$$

$$\rho_{raw1\_attenuation} = \left(\frac{1-E}{E}\right)\rho_{raw1}$$

$$A_{T\_raw1\_attenuation} = \frac{PR1}{PR2\left(e^{\left(\frac{PB}{ATemp+273.15}\right)} - PF\right)} - PO \tag{10}$$

$$A_{T\_raw1\_attenuation} = \left(\frac{1-\ddot{I}_n}{E\ddot{I}_n}\right) A_{T\_raw1}$$

$$Wind_{raw} = \frac{PR1}{PR2\left(e^{\left(\frac{PB}{IRWTemp+273.15}\right)} - PF\right)} - PO \tag{11}$$

$$Wind_{raw\_attenuation} = \left(\frac{\varepsilon_{wind} * IRT}{E\tau}\right) Wind_{raw}$$

$$\rho_{raw2} = \frac{PR1}{PR2\left(e^{\left(\frac{PB}{RTemp+273.15}\right)} - PF\right)} - PO$$

$$\rho_{raw2\_attenuation} = \left(\frac{\rho_{wind} IRT}{E\tau}\right) \rho_{raw2} \tag{12}$$

$$A_{T\_raw2} = \frac{PR1}{PR2\left(e^{\left(\frac{PB}{ATemp+273.15}\right)} - PF\right)} - PO$$

$$A_{T\_raw2\_attenuation} = \left(\frac{(1-\tau)IRT}{E\tau^2}\right) A_{T\_raw2} \tag{13}$$

$$Obj_{raw} = \frac{raw_{data} IRT}{E\tau^2} - \rho_{raw1\_attenuation} - A_{T_{raw1\_attenuation}} - \\ Wind_{raw\_attenuation} - \rho_{raw2\_attenuation} - A_{T_{raw2\_attenuation}} \tag{14}$$

Then, we finally compute the temperature at the surface layer comprising of the top surface of the part from radiance $$T(\text{in } \hat{a}_n f) = \frac{PB}{\log\left(\frac{PR1}{(PR2(Obj_{raw} + PO) + PF)}\right)} â€" 273.15 \tag{15}$$

The FLIR ONE PRO metadata is as follows:

| | |
|---|---|
| AtmosphericTemperature | ATEMP |
| Emissivity | E |
| IRWindowTemperature | IRWT |
| IRWindowTransmission | IRT |
| PlanckB | PB |
| PlanckF | PF |
| PlanckO | PO |
| PlanckR1 | PR1 |
| PlanckR2 | PR2 |
| ReflectedApparentTemperature | RTEMP |
| RelativeHumidity | RH |
| SubjectDistance | OD |

Extraction of Boundary Condition Temperature on Top Surface

Figure 10:
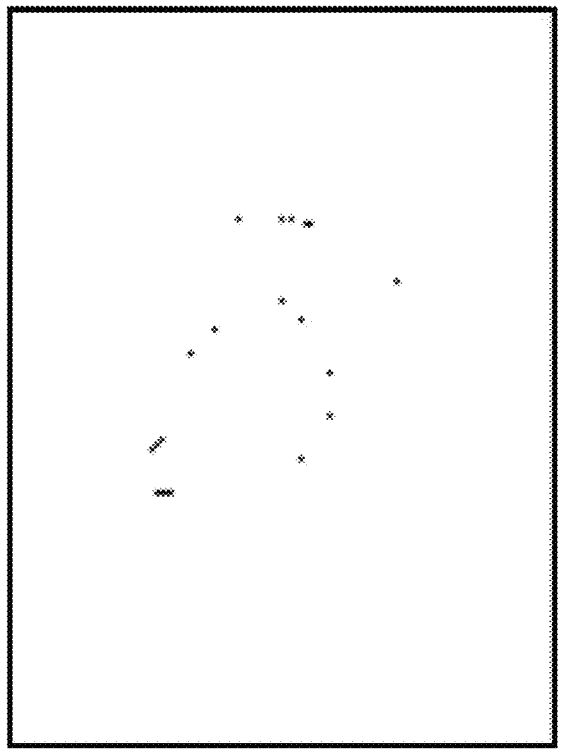
FIG. 10 ("Edge Image") shows a processed thermal image after the thermal image in FIG. 9 is processed with conventional edge detection filters.
Figure 9:
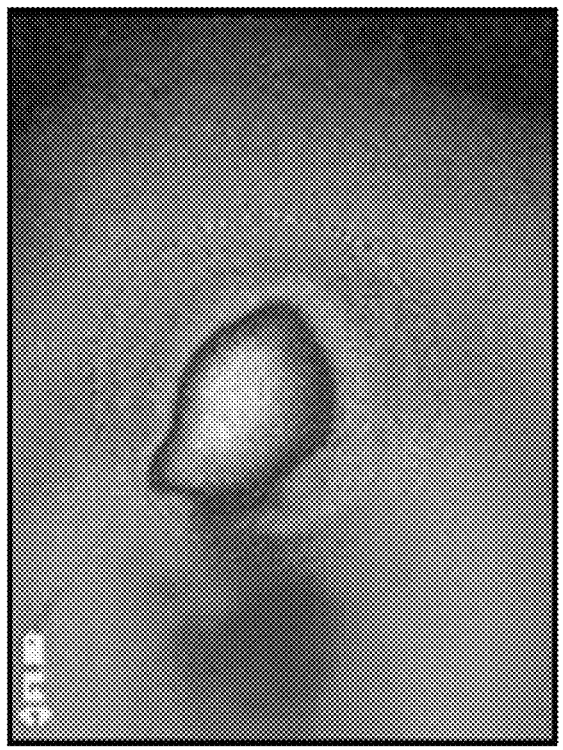
FIG. 9 shows a thermal image that was captured by a thermal sensor (e.g. an FLIR sensor).

First, the Original image is converted to BGR gray image with Bilateral noise and Canny Edge Detection Filters as shown in FIG. 9. The image in FIG. 9 can be processed with conventional edge detection filters that detect edges between adjacent regions in the image and can produce the result shown in FIG. 10.

Figure 11:
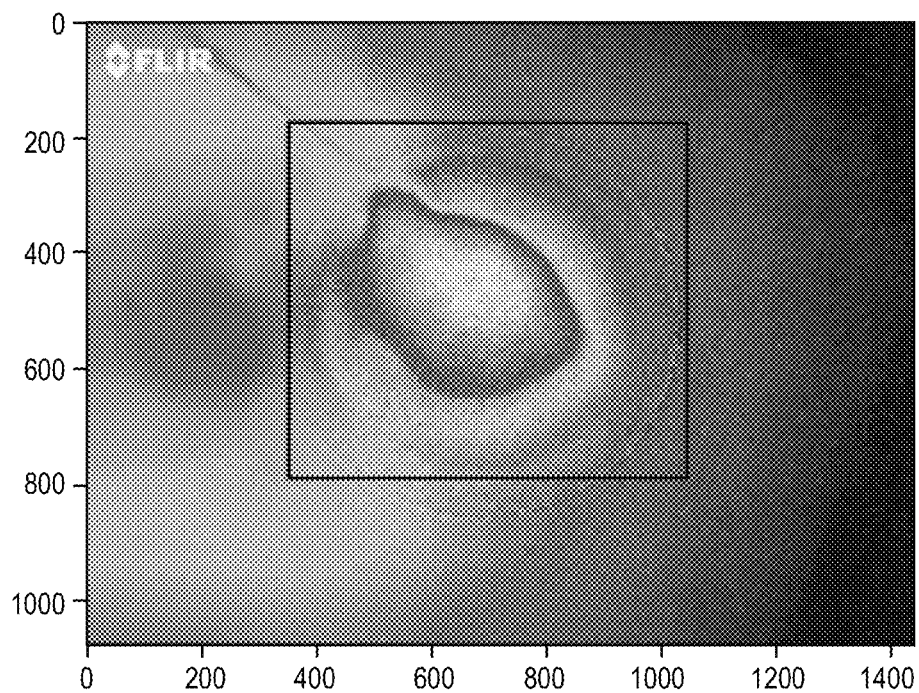
FIG. 11 shows a rectangular contour fitted or identified around at least a portion of the part or object in the fabrication process.

Second, the contour of the edge detected image is identified as shown in FIG. 11.

Figure 12:
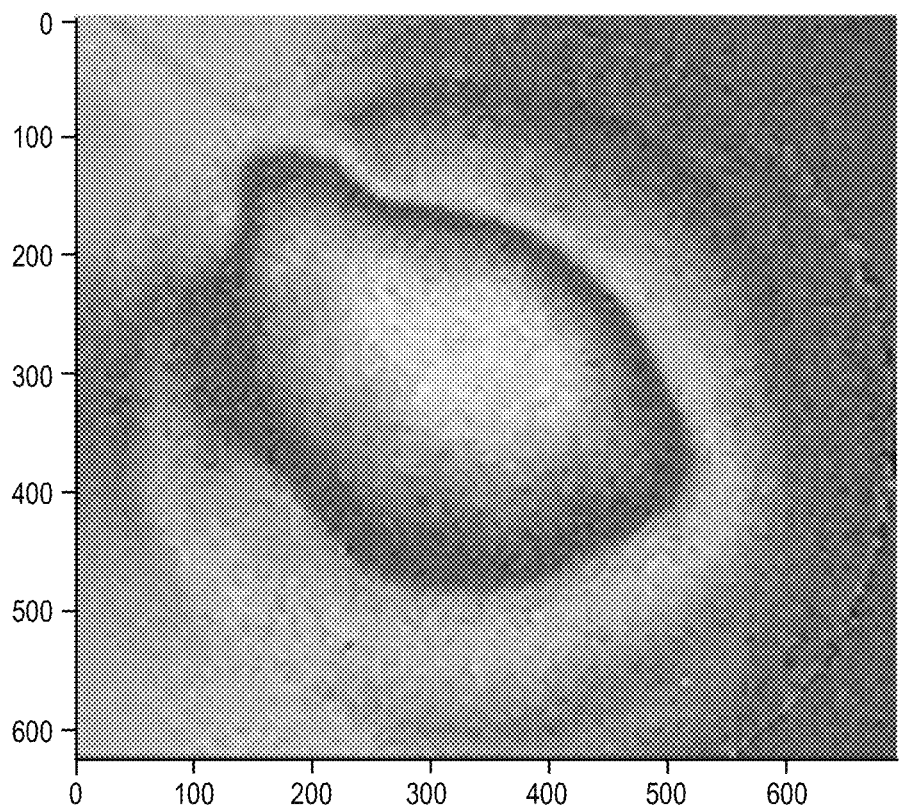
FIG. 12 shows an enlarged view of a portion of FIG. 11.

Third, the geometry is cropped to the contour to supply thermal information (Tbc top surface data) used in equation (2) as shown in FIG. 11. In the example shown in FIG. 11, a rectangular contour is fitted or identified around the top surface of the part or object in the fabrication process. FIG. 12 shows an enlarged view of a portion of FIG. 11; in one embodiment, Tbc can be set at zero for nodes between the top and bottom layers, and with respect to the bottom layer, nodes in the bottom layer can be set to an ambient temperature thermal condition (e.g. room temperature or regulated heater temperature, etc.).

Figure 13:
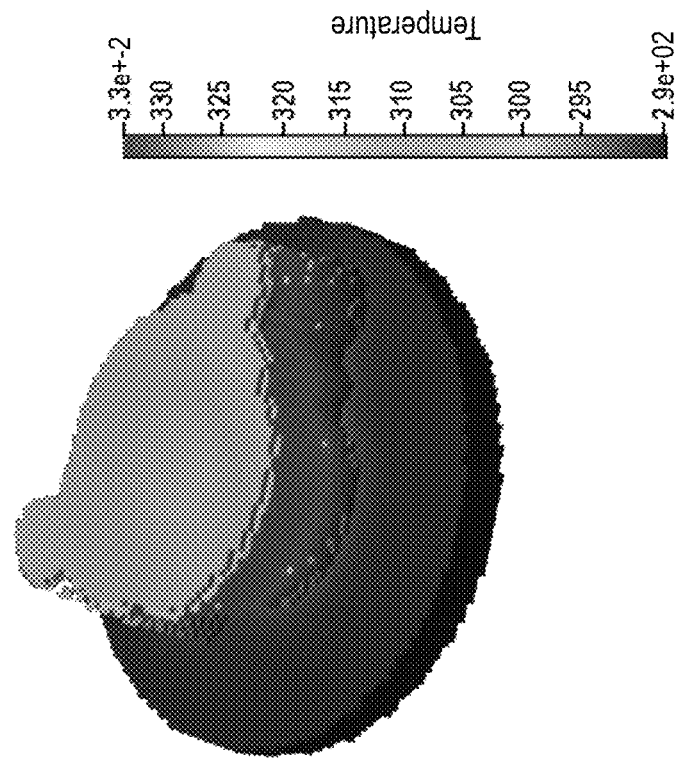
FIG. 13 shows, in two views (left and right views), the differences in boundary conditions between a first simulation (using assumed boundary conditions) and a second simulation (using boundary conditions derived from sensor measurements); the left view shows the assumed boundary conditions that were used for the first simulation and the right view shows the real boundary conditions derived from one or more sensor measurements.
Figure 13:
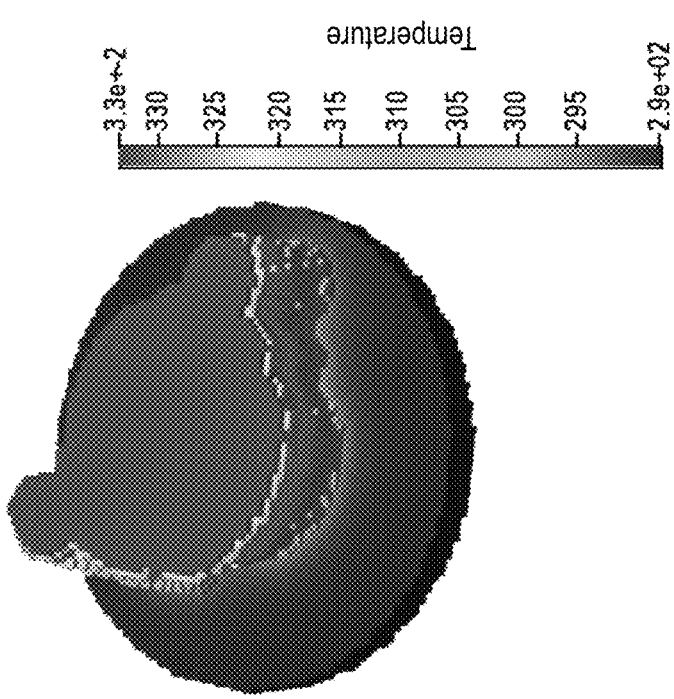

Differences Between Volumetric Solution Using Assumed and Real-time Boundary Conditions The following example shows the results obtained using glass transition temperature (converted to Neumann Boundary condition) of PLA material and real-time boundary conditions as shown in FIG. 13.

The left image in FIG. 13 shows the simulation using assumed boundary conditions (on the top surface), and the right image in FIG. 13 shows the simulation (e.g. a second simulation) using real boundary conditions (on the top surface) derived from actual sensor measurements.

Note that the image on the right top surface in FIG. 13 doesn't have constant temperatures but when the scale is set to glass transition temperature maximum in accordance with left image, it apparently appears so.

Boundary Condition Correction

The following example shows how parameters in a fabrication process can be changed based upon outputs from a second simulation that used sensor measurements to compute real boundary conditions. The following example can be one embodiment of operation 313 or operation 637 described above. In one embodiment, a couple of parameters which can be changed (for example in Additive polymeric extrusion based FEA) are speed of the extrude from a nozzle and nozzle temperature. In one embodiment, the speed of the extrude from the nozzle can be controlled and the temperature of the nozzle can also be controlled. If we solve for the difference problem in temperature distribution and understand the relationship such as between nozzle temperature and real temperature (generally 1 to 1-1 degree change in nozzle temperature is linearly related to 1 degree change in difference problem temperature), the problem can be corrected as a function of process parameters. A similar approach can be used for real-time structural finite element or metal additive manufacturing technologies although the process parameters that are adjusted are power and speed.

We solve for the following change in flux using equations 1-4

$$\Delta f = -K(T_{assumedNeumanntopsurface\_aftersolvingVTD} - T_{realtimetopsurface})$$

Figure 14:
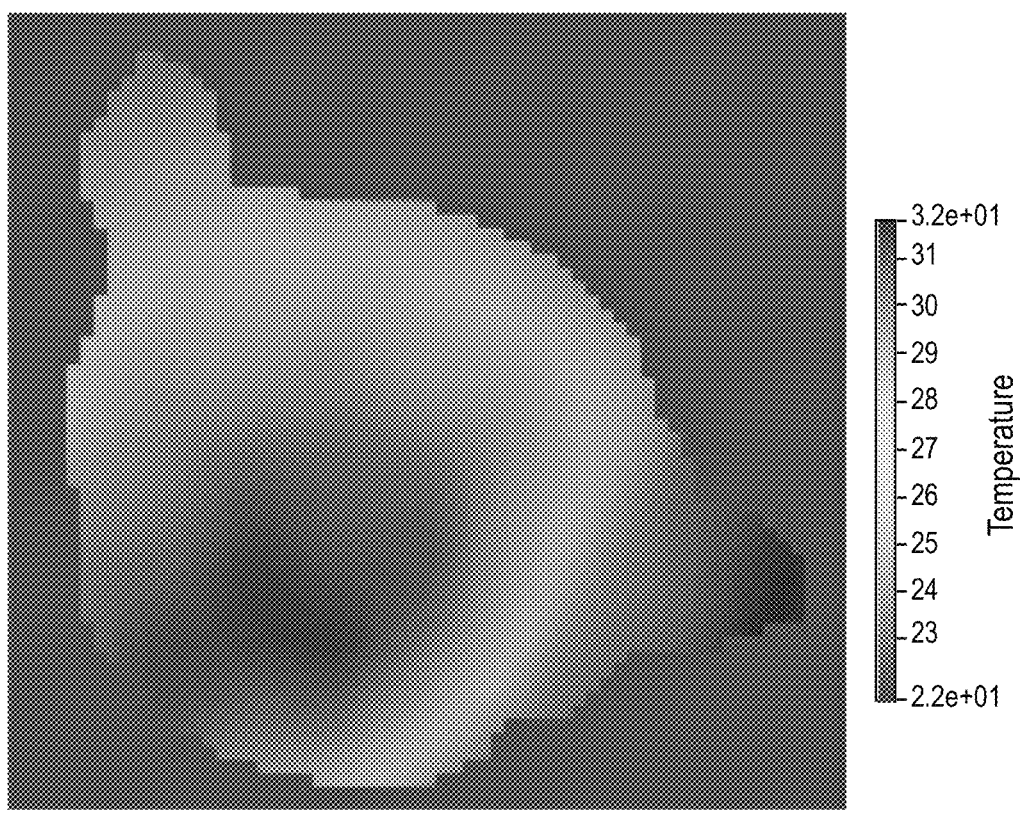
FIG. 14 shows an example of how a fabrication process can be changed based upon the results from the second simulation that is based on sensor measurements.

Once solved, the top surface of the Volumetric Temperature Distribution is plotted and the nozzle temperature has to be increased at local positions shown in FIG. 14 respectively. FIG. 14 shows the change in nozzle temperature as a function of location on the top surface. In one embodiment, the outputs of second simulation are used to determine how to adjust the nozzle temperature during the remainder of the fabrication process.

The embodiments described herein can also help with prediction and mitigation of internal defects. In this modality, there are two options for defect identification.

If the defect is already present and could be observed while the thermal camera is taking an image of layer 'n−1'. Then, the defect is identified directly. This will be termed 'Direct Identification'. The directly identified defects can be corrected in layers 'n' through 'm' where m≥n by modifying the fabrication process during the fabrication process.

If the defect is not present at the time of processing layer 'n−1' and therefore couldn't be observed while the thermal camera is taking an image on the same layer but occurs posteriori while processing layer 'n' and observing it for inappropriate thermal signatures as it relates to layers 1 through 'n−1'. Then, an ideal image at layer 'n+1' is reconstructed based on the thermal image capture available at layer 'n' and compared against the thermal image capture available at layer 'n+1' for defect identification.

Figure 15:
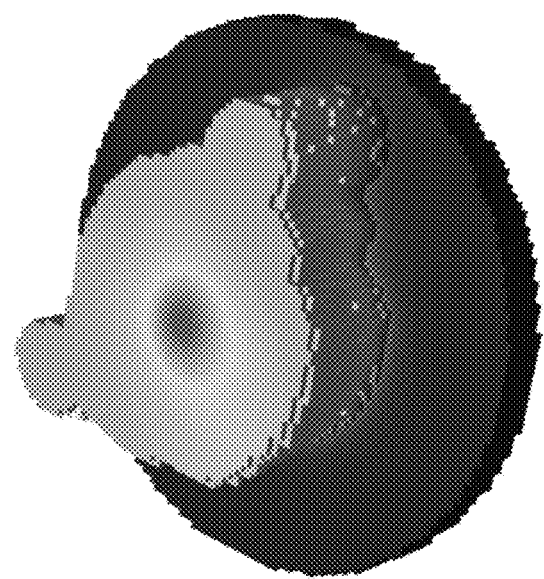
FIG. 15 shows, in two views, an example of how a defect can be detected (e.g. during a fabrication process) and then mitigated according to an embodiment.
Figure 15:
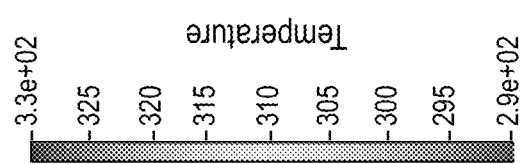
Figure 15:
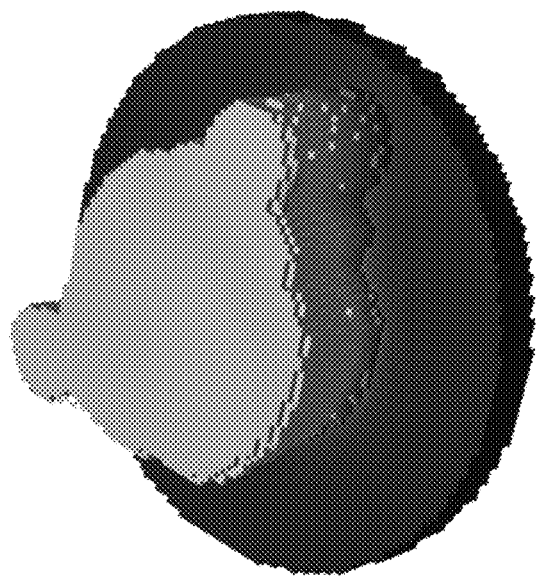
Figure 16:
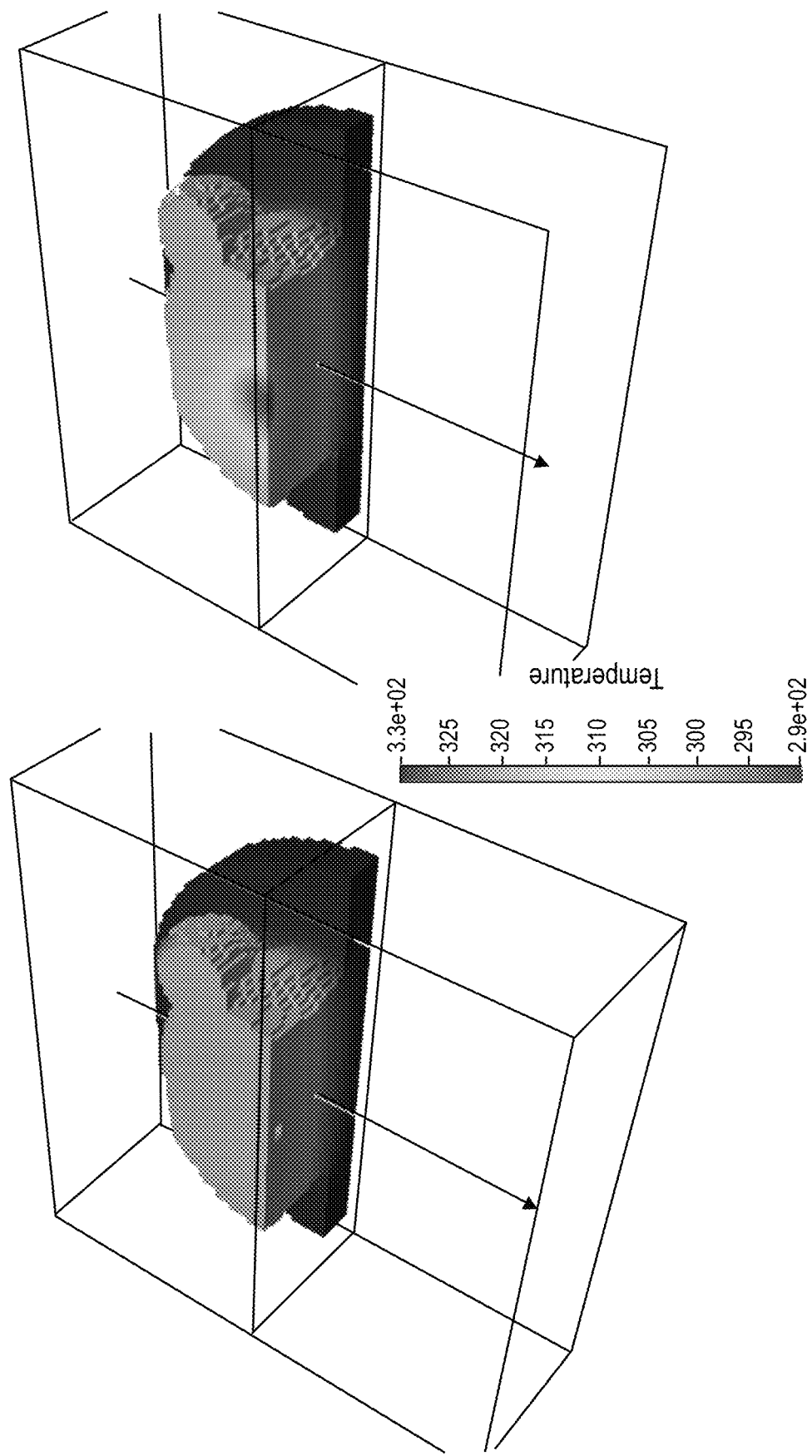
FIG. 16 shows, in two views, an example of how a defect can be detected and then mitigated according to an embodiment.

Defect mitigation: For defect mitigation, an inverse problem could be solved for acquiring the correct thermal setpoints on the top surface for layer 'n+2' as shown below in FIGS. 15 and 16.

Figure 17:
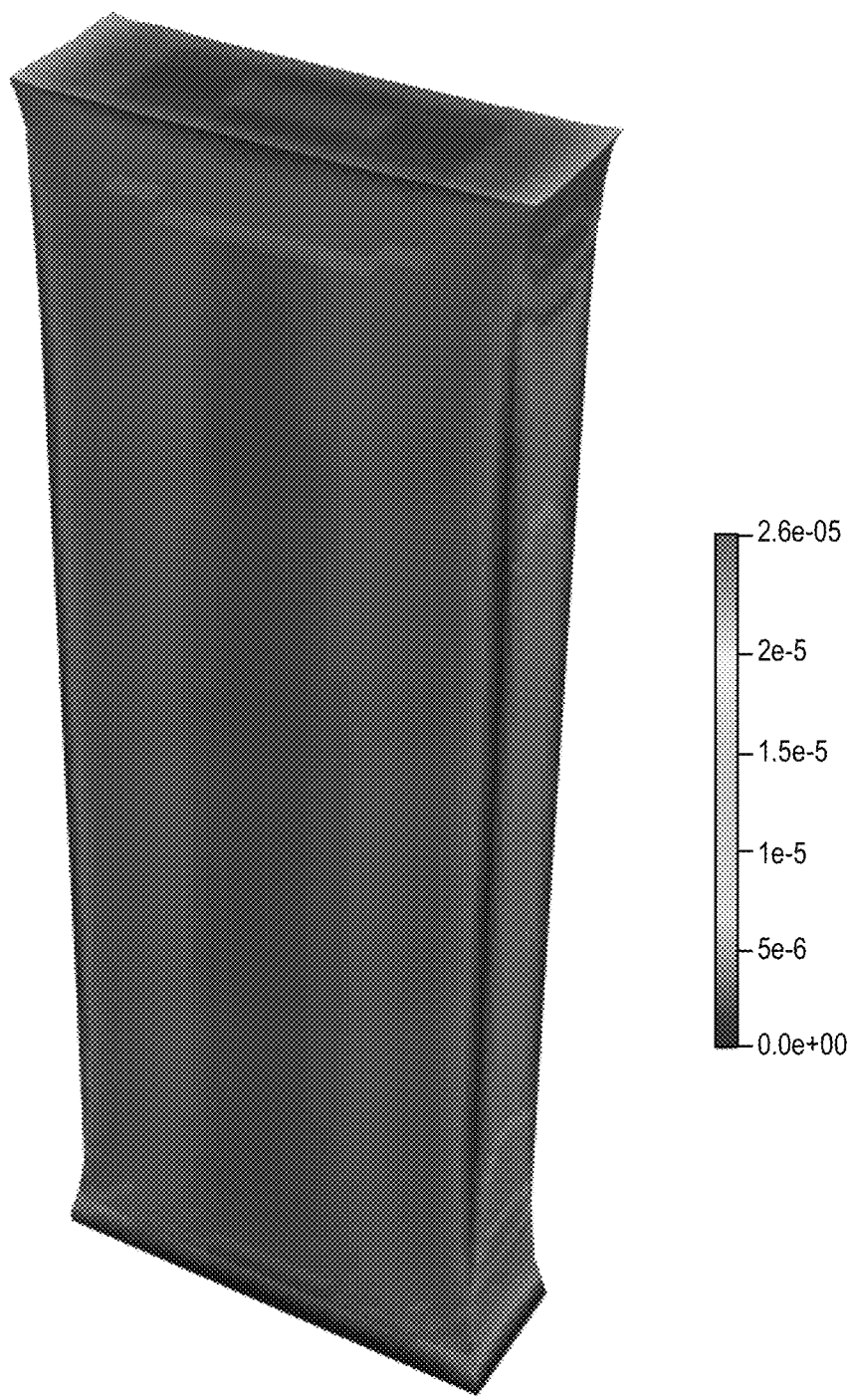
FIG. 17 shows an example of how an embodiment can be used to predict thermal strain which in turn can be used to compute residual stresses and displacements

The volumetric temperatures from embodiments described herein can be used for predicting the thermal strain resulting in in-direct computation of residual stresses and displacements as shown in FIG. 17. The direct method comprises of recording top surface displacement data.

Figure 7:
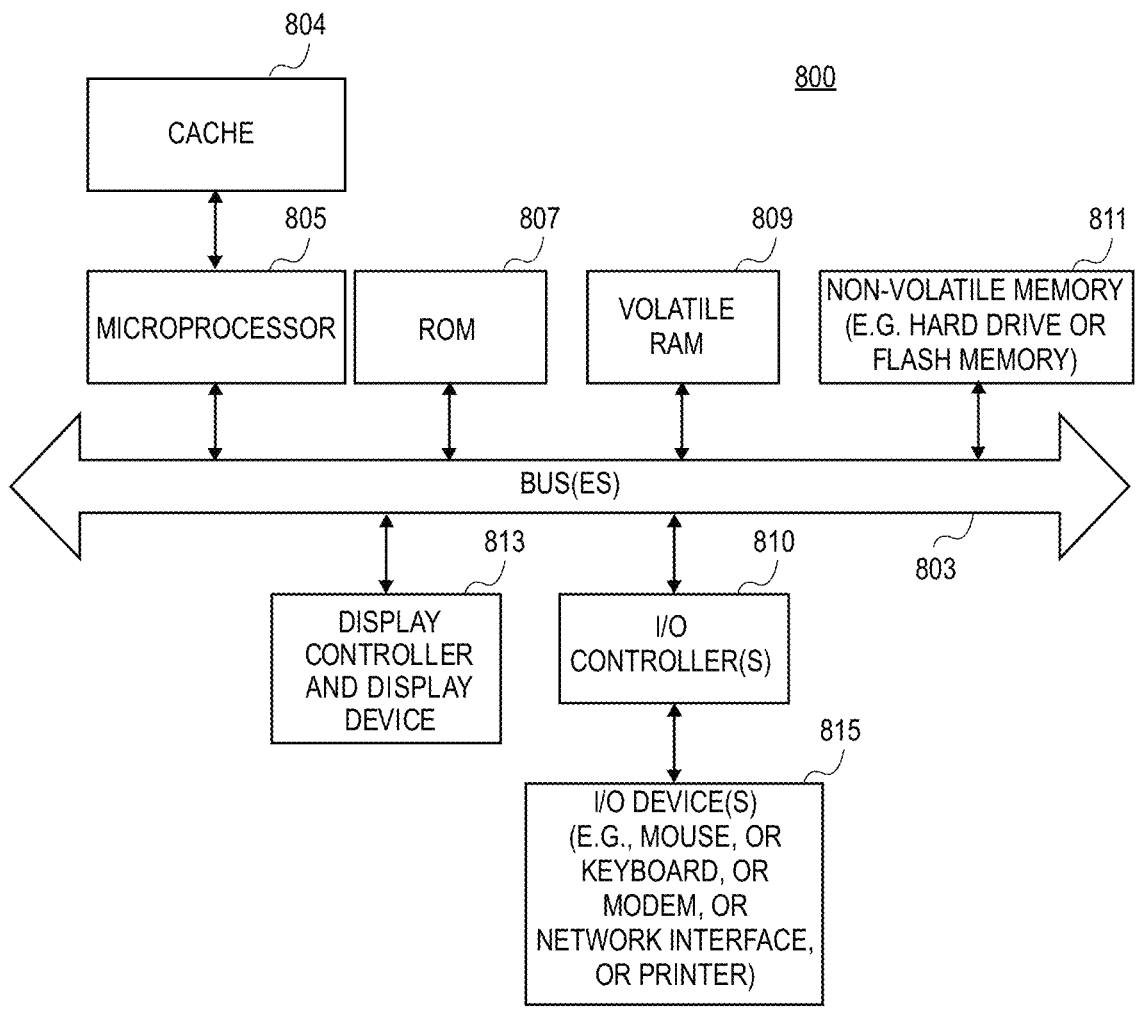
FIG. 7 is a block diagram of a data processing system that can perform or implement one or more embodiments described herein; for example, the data processing system in FIG. 7 can be used to implement the data processing system 101 shown in FIG. 1 or can be used to implement the simulation tool 207 shown in FIG. 2.

FIG. 7 shows one example of a data processing system 800, which may be used with one embodiment. For example, the system 800 may be implemented to provide a system 101 as shown in FIG. 1 or a simulation tool 207 shown in FIG. 2. Note that while FIG. 7 illustrates various components of a device, it is not intended to represent any particular architecture or manner of interconnecting the components as such details are not germane to the disclosure. It will also be appreciated that network computers and other data processing systems or other consumer electronic devices, which have fewer components or perhaps more components, may also be used with embodiments of the disclosure.

As shown in FIG. 7, the device 800, which is a form of a data processing system, includes a bus 803 which is coupled to a microprocessor(s) 805 and a ROM (Read Only Memory) 807 and volatile RAM 809 and a non-volatile memory 811. The microprocessor(s) 805 may retrieve the instructions from the memories 807, 809, 811 and execute the instructions to perform operations described above. The microprocessor(s) 805 may contain one or more processing cores. The bus 803 interconnects these various components together and also interconnects these components 805, 807, 809, and 811 to a display controller and display device 813 and to peripheral devices such as input/output (I/O) devices 815 which may be touchscreens, mice, keyboards, modems, network interfaces, printers and other devices which are well known in the art. Typically, the input/output devices 815 are coupled to the system through input/output controllers 810. The volatile RAM (Random Access Memory) 809 is typically implemented as dynamic RAM (DRAM), which requires power continually in order to refresh or maintain the data in the memory.

The non-volatile memory 811 is typically a magnetic hard drive or a magnetic optical drive or an optical drive or a DVD RAM or a flash memory or other types of memory systems, which maintain data (e.g., large amounts of data) even after power is removed from the system. Typically, the non-volatile memory 811 will also be a random access memory although this is not required. While FIG. 7 shows that the non-volatile memory 811 is a local device coupled directly to the rest of the components in the data processing system, it will be appreciated that embodiments of the disclosure may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The disclosure also relates to an apparatus for performing the operations described herein. This apparatus may be specially constructed for the required purpose, or it may comprise a general-purpose device selectively activated or reconfigured by a computer program stored in the device. Such a computer program may be stored in a computer readable storage medium, such as, but not limited to, any type of disk including floppy disks, optical disks, CD-ROMs, and magnetic-optical disks, DRAM (volatile), flash memory, read-only memories (ROMs), RAMs, EPROMs, EEPROMs, magnetic or optical cards, or any type of media suitable for storing electronic instructions, and each coupled to a device bus.

A machine readable medium includes any mechanism for storing information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a device memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "sending," "terminating," "waiting," "changing," or the like, refer to the action and processes of a device, or similar electronic computing device, that manipulates and transforms data represented as physical (electronic) quantities within the device's registers and memories into other data similarly represented as physical quantities within the device memories or registers or other such information storage, transmission or display devices.

The processes and displays presented herein are not inherently related to any particular device or other apparatus. Various general-purpose systems may be used with programs in accordance with the teachings herein, or it may prove convenient to construct a more specialized apparatus to perform the operations described. The required structure for a variety of these systems will be evident from the description below. In addition, the disclosure is not described with reference to any particular programming language. It will be appreciated that a variety of programming languages may be used to implement the teachings of the disclosure as described herein.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A non-transitory machine readable medium storing executable program instructions which when executed cause a data processing system to perform a method, the method comprising:
   performing a first simulation of a fabrication process, the first simulation computing a first set of results to define predicted physical responses based on thermal properties for a first object to be created in the fabrication process, the first set of results based on a first set of one or more assumed boundary conditions;
   receiving, from one or more sensors, sensor measurements of one or more parameters that are sensed by the one or more sensors during the fabrication process after the fabrication process has been initiated;
   performing a second simulation based on the sensor measurements, the second simulation computing a second set of results based on the sensor measurements and based on a second set of boundary conditions that are based on the sensor measurements; and
   storing the second set of results for use in performing a modified fabrication process.

2. The medium as in claim 1 wherein the modified fabrication process is a continuation of the fabrication of the first object after receiving the sensor measurements and wherein the thermal properties include CALPHAD properties.

3. The medium as in claim 2 wherein the method further comprises outputting the second set of results to drive the modified fabrication process for the continued fabrication of the first object.

4. The medium as in claim 1 wherein the modified fabrication process is used to fabricate a second object after the first object was fabricated or its fabrication was aborted.

5. The medium as in claim 1 wherein the method further comprises initiating the fabrication process to fabricate the first object.

6. The medium as in claim 1 wherein the method further comprises comparing the first set of results to the second set of results to determine a degree of discrepancy of at least one of temperature or displacement of one or more simulated nodes on a mesh in a finite element analysis simulation of the first object.

7. The medium as in claim 6 wherein the method further comprises dynamically updating the fabrication process as it occurs without stopping it to create the modified fabrication process based on the degree of discrepancy.

8. The medium as in claim 1 wherein the fabrication process comprises an additive manufacturing process and wherein information about the first object is stored in a computer automated design file having an STL file format.

9. The medium as in claim 8 wherein the method further comprises matching a sensed position on the first object during the fabrication process with a location in the computer automated design file.

10. The medium as in claim 1 wherein the first set of boundary conditions and the second set of boundary conditions are constraints used for the solution of one or more differential equations which are solved in the first simulation and the second simulation respectively.

11. The medium as in claim 1 wherein the sensor measurements comprise image data of the first object and wherein the image data is used to derive displacement data for nodes.

12. The medium as in claim 1 wherein the sensor measurements comprise temperature data for locations on the first object during the fabrication process, which locations are matched to the position of each node in a set of nodes in at least the second simulation.

13. The medium as in claim 1 wherein the method further comprises outputting display data to an augmented reality display, the display data based on the second set of results.

14. A method comprising:
performing a first simulation of a fabrication process, the first simulation computing a first set of results to define predicted physical responses based on thermal properties for a first object to be created in the fabrication process, the first set of results based on a first set of one or more assumed boundary conditions;
receiving, from one or more sensors, sensor measurements of one or more parameters that are sensed by the one or more sensors during the fabrication process after the fabrication process has been initiated;
performing a second simulation based on the sensor measurements, the second simulation computing a second set of results based on the sensor measurements and based on a second set of boundary conditions that are based on the sensor measurements; and storing the second set of results for use in performing a modified fabrication process.

15. The method as in claim 14 wherein the modified fabrication process is a continuation of the fabrication of the first object after receiving the sensor measurements and wherein the thermal properties include CALPHAD properties.

16. The method as in claim 15 wherein the method further comprises outputting the second set of results to drive the modified fabrication process for the continued fabrication of the first object.

17. The method as in claim 14 wherein the modified fabrication process is used to fabricate a second object after the first object was fabricated or its fabrication was aborted.

18. The method as in claim 14 wherein the method further comprises initiating the fabrication process to fabricate the first object.

19. The method as in claim 14 wherein the method further comprises comparing the first set of results to the second set of results to determine a degree of discrepancy of at least one of temperature or displacement of one or more simulated nodes on a mesh in a finite element analysis simulation of the first object.

20. The method as in claim 19 wherein the method further comprises dynamically updating the fabrication process as it occurs without stopping it to create the modified fabrication process based on the degree of discrepancy.

21. The method as in claim 14 wherein the fabrication process comprises an additive manufacturing process and wherein information about the first object is stored in a computer automated design file having an STL file format.

22. The method as in claim 21 wherein the method further comprises matching a sensed position on the first object during the fabrication process with a location in the computer automated design file.

23. The method as in claim 14 wherein the sensor measurements comprise temperature data for locations on the first object during the fabrication process, which locations are matched to the position of each node in a set of nodes in at least the second simulation.

24. The method as in claim 14 wherein the method further comprises outputting display data to an augmented reality display, the display data based on the second set of results.

25. The medium as in claim 1 wherein the second simulation provides data to mitigate a defect detected during the fabrication process.

26. The medium as in claim 1 wherein the second simulation provides data to predict thermal strain, from which residual stress is computed.

27. A non-transitory machine readable medium storing executable program instructions which when executed cause a data processing system to perform a method, the method comprising:
performing a first simulation of a first object involved in a process, the first simulation computing a first set of results to define predicted physical responses based on thermal or other properties for the first object, the first set of results based on a first set of one or more assumed boundary conditions;
receiving, from one or more sensors, sensor measurements of one or more parameters that are sensed by the one or more sensors during the process after the process has been initiated;
performing a second simulation based on the sensor measurements, the second simulation computing a second set of results based on the sensor measurements and based on a second set of boundary conditions that are based on the sensor measurements; and storing the second set of results for use in creating a modified first object or a modified process.

28. The medium as in claim 1 wherein the first object is a car and the process includes a car crash.

29. The medium as in claim 1, wherein the second simulation is a simulation of the fabrication process.

30. The method as in claim 14, wherein the second simulation is a simulation of the fabrication process.

31. The method of claim 30, wherein the first set of boundary conditions and the second set of boundary conditions are constraints used for the solution of one or more differential equations which are solved in the first simulation and the second simulation respectively.

32. The medium of claim 27, wherein the first set of boundary conditions and the second set of boundary conditions are constraints used for the solution of one or more differential equations which are solved in the first simulation and the second simulation respectively.

* * * * *